United States Patent
Cong et al.

(10) Patent No.: US 12,209,873 B2
(45) Date of Patent: Jan. 28, 2025

(54) METHOD AND APPARATUS FOR UNMANNED VEHICLE DISPATCHING MANAGEMENT, DEVICE, STORAGE MEDIUM AND PROGRAM

(71) Applicant: Apollo Intelligent Driving Technology (Beijing) Co., Ltd., Beijing (CN)

(72) Inventors: Xiaoliang Cong, Beijing (CN); Yaling Zhang, Beijing (CN); Xiangyang Liu, Beijing (CN); Ming Li, Beijing (CN); Hao Zhou, Beijing (CN); Weinan Ma, Beijing (CN); Zhenxi Weng, Beijing (CN); Lili Liu, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 240 days.

(21) Appl. No.: 17/724,803

(22) Filed: Apr. 20, 2022

(65) Prior Publication Data
US 2022/0244058 A1    Aug. 4, 2022

(30) Foreign Application Priority Data

Aug. 11, 2021  (CN) .......................... 202110921409.7

(51) Int. Cl.
*G01C 21/34*  (2006.01)
*B60W 60/00*  (2020.01)

(52) U.S. Cl.
CPC ....... *G01C 21/3438* (2013.01); *B60W 60/001* (2020.02); *G01C 21/343* (2013.01); *G01C 21/3484* (2013.01)

(58) Field of Classification Search
CPC .............. G01C 21/3438; G01C 21/343; G01C 21/3484; B60W 60/001
See application file for complete search history.

(56) References Cited

U.S. PATENT DOCUMENTS

2015/0338226 A1* 11/2015 Mason ............. G08G 1/096816
                                                                       701/408
2018/0188058 A1* 7/2018 Dabholkar ......... G01C 21/3617
(Continued)

FOREIGN PATENT DOCUMENTS

CN       108427412 A    8/2018
CN       108460966 A    8/2018
(Continued)

OTHER PUBLICATIONS

Office Action from corresponding Chinese Application No. 202110921409.7, dated May 31, 2022, 8 pages.
(Continued)

*Primary Examiner* — Roberto Borja
(74) *Attorney, Agent, or Firm* — Tucker Ellis LLP

(57) ABSTRACT

The present disclosure provides a method and apparatus for unmanned vehicle dispatching management, a device, a storage medium and a program, which relates to autonomous driving and intelligent transportation technology in artificial intelligence. The specific implementation solution includes: receiving an unmanned vehicle dispatching request; determining, according to the unmanned vehicle dispatching request, a first task type corresponding to a first unmanned vehicle to be dispatched; generating a first order corresponding to the first unmanned vehicle, where the first order is used to indicate a driving task to be performed by the first unmanned vehicle, and a type of the driving task is the first task type; and sending the first order to the first unmanned vehicle. Through the above process, a dispatching management of unmanned vehicles is realized from the task dimension, so that there is no need to distinguish the types of unmanned vehicles.

12 Claims, 5 Drawing Sheets

(56) References Cited

U.S. PATENT DOCUMENTS

| | | | |
|---|---|---|---|
| 2018/0308191 A1* | 10/2018 | Matthiesen | G01C 21/3407 |
| 2020/0073407 A1* | 3/2020 | He | G05D 1/0293 |
| 2020/0082304 A1 | 3/2020 | Xia | |
| 2020/0166942 A1 | 5/2020 | Kwatra et al. | |
| 2020/0262454 A1 | 8/2020 | Uehara et al. | |
| 2021/0149390 A1 | 5/2021 | Hyvärinen | |
| 2021/0215490 A1* | 7/2021 | Mishra | G01C 21/3614 |

FOREIGN PATENT DOCUMENTS

| | | |
|---|---|---|
| CN | 108960469 A | 12/2018 |
| CN | 109376987 A | 2/2019 |
| CN | 110531761 A | 12/2019 |
| CN | 111008792 A | 4/2020 |
| CN | 111210303 A | 5/2020 |
| CN | 112288518 A | 1/2021 |
| WO | 2019/079546 A1 | 4/2019 |

OTHER PUBLICATIONS

European Search Report of corresponding European Patent Application No. 22169162.9, dated Aug. 30, 2022, 7 pages.
Office Action of corresponding Chinese Application No. 202110921409.7 and translation, 14 pages.

\* cited by examiner

METHOD AND APPARATUS FOR UNMANNED VEHICLE DISPATCHING MANAGEMENT, DEVICE, STORAGE MEDIUM AND PROGRAM

CROSS-REFERENCE TO RELATED APPLICATION

This application claims priority to Chinese Patent Application No. 2021109214097, filed on Aug. 11, 2021, which is hereby incorporated by reference in its entirety.

TECHNICAL FIELD

The present disclosure relates to the field of autonomous driving and intelligent transportation technology in artificial intelligence, and more particularly, to a method and apparatus for unmanned vehicle dispatching management, a device, a storage medium and a program.

BACKGROUND

With the development of autonomous driving technology, there are more and more types of unmanned vehicles. The current types of unmanned vehicles include but are not limited to: unmanned taxis, unmanned buses, unmanned inspection vehicles, unmanned sweeping vehicles, unmanned logistics vehicles, unmanned retail vehicles, and the like.

In the prior art, when applying dispatching management to the unmanned vehicle, the dispatching management is usually performed based on the type of the unmanned vehicle. That is to say, for different types of unmanned vehicles, different dispatching management methods are adopted.

SUMMARY

The present disclosure provides a method and apparatus for unmanned vehicle dispatching management, a device, a storage medium and a program.

According to the first aspect of the present disclosure, a method for unmanned vehicle dispatching management is provided, including:
receiving an unmanned vehicle dispatching request;
determining, according to the unmanned vehicle dispatching request, a first task type corresponding to a first unmanned vehicle to be dispatched;
generating a first order corresponding to the first unmanned vehicle, where the first order is used to indicate a driving task to be performed by the first unmanned vehicle, and a type of the driving task is the first task type; and
sending the first order to the first unmanned vehicle.

According to the second aspect of the present disclosure, an electronic device is provided, including:
at least one processor; and
a memory communicatively connected with the at least one processor; where the memory is stored with instructions executable by the at least one processor, and the instructions are executed by the at least one processor, so that the at least one processor can execute the method according to the first aspect.

According to the third aspect of the present disclosure, a non-transitory computer-readable storage medium stored with computer instructions is provided, wherein the computer instructions are configured to enable a computer to execute the method according to the first aspect.

It should be understood that the content described in this section is not intended to identify the key or important features of the embodiments of the present disclosure, nor is intended to limit the scope of the present disclosure. Other features of the present disclosure will become easy to understand through the following description.

BRIEF DESCRIPTION OF DRAWINGS

The drawings are used to better understand the solutions and do not constitute a limitation to the present disclosure. Among them.

DESCRIPTION OF EMBODIMENTS

Exemplary embodiments of the present application will be explained hereunder with reference to the accompanying drawings, which include various details of the embodiments of the present disclosure to facilitate understanding, and should be regarded as merely exemplary. Therefore, those of ordinary skill in the art should recognize that various changes and modifications can be made to the embodiments described herein without departing from the scope and spirit of the present disclosure. Likewise, for clarity and conciseness, descriptions of well-known functions and structures are omitted in the following description.

The present disclosure provides a method and apparatus for unmanned vehicle dispatching management, a device, a storage medium and a program which are applied to autonomous driving and intelligent transportation technology in artificial intelligence to reduce the complexity of unmanned vehicle dispatching management.

Figure 1:
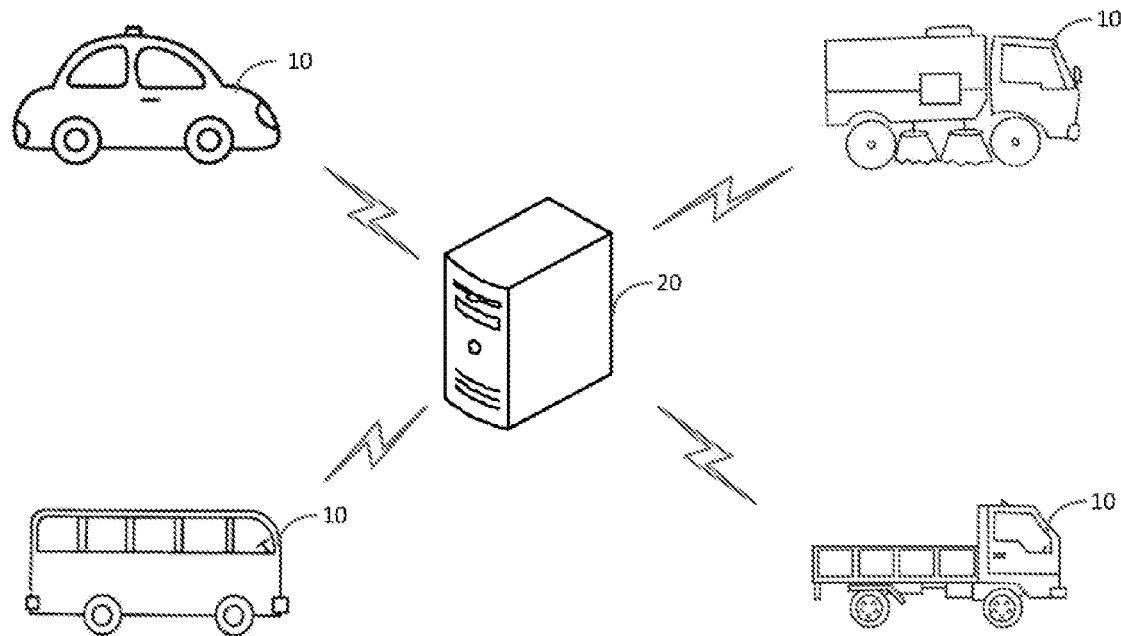
FIG. 1 is a schematic diagram of an application scenario provided by an embodiment of the present disclosure.

FIG. 1 is a schematic diagram of an application scenario provided by an embodiment of the present disclosure. As demonstrated in FIG. 1, the application scenario includes: a server 20 and multiple unmanned vehicles 10 communicatively connected with the server 20. The unmanned vehicles are vehicles that use autonomous driving technology. According to the intelligence level of autonomous driving, the autonomous driving technology can be divided into multiple levels. In the present embodiment, the level of the autonomous driving technology adopted by the unmanned vehicle is not limited.

The server 20 provides a dispatching management service for multiple unmanned vehicles 10. The server 20 may be a cloud server, also known as a cloud computing server or a cloud host, which is a host product in the cloud computing service system, solving the defects of difficult management and weak business expansion of traditional physical hosts and VPS services ("Virtual Private Server", or "VPS" for short). The server can also be a server of a distributed system, or a server combined with a block-chain.

In the embodiment of the present disclosure, the multiple unmanned vehicles 10 may be different types of unmanned vehicles. The types of unmanned vehicles 10 include, but are not limited to, unmanned taxis, unmanned buses, unmanned inspection vehicles, unmanned sweeping vehicles, unmanned logistics vehicles, unmanned retail vehicles, and the like. A platform for unmanned vehicle dispatching management is deployed in the server 20. The platform for unmanned vehicle dispatching management supports the dispatching management of various types of unmanned vehicles.

With the development of artificial intelligence technology and its application in different fields, the types of unmanned vehicles continue to diversify. In the prior art, when applying dispatching management to the unmanned vehicle, the dispatching management is usually performed based on the type of the unmanned vehicle. That is to say, for different types of unmanned vehicles, different dispatching management methods are adopted. Even in some related technologies, due to the different dispatching management methods corresponding to different types of unmanned vehicles, different types of unmanned vehicles are usually managed by different dispatching management platforms. In this way, when the types of unmanned vehicles continue to increase, the complexity of unmanned vehicles dispatching management is relatively high.

In order to solve the above technical problem, in the embodiment of the present disclosure, the unmanned vehicle dispatching management is no longer based on the type of the unmanned vehicle, but on the task dimension. Exemplarily, the driving tasks of the unmanned vehicle can be divided into the following task types: operating type, testing type, and route reception type. Different task types correspond to different dispatching management methods. Each unmanned vehicle corresponds to a task type. When a first unmanned vehicle needs to be dispatched, a driving task is assigned to the first unmanned vehicle according to a task type corresponding to the first unmanned vehicle.

In the embodiment of the present disclosure, since the unmanned vehicles are managed according to the task type, the platform for unmanned vehicle dispatching management does not need to distinguish the types of unmanned vehicles, so that it can support various types of unmanned vehicles, which reduces the complexity of unmanned vehicle dispatching management. Further, even if a new type of unmanned vehicle is added, the platform for unmanned vehicle dispatching management can support the new type of unmanned vehicle without adding a dispatching processing process for the new type of unmanned vehicle.

The technical solutions of the present disclosure will be described in detail below with specific embodiments. The following specific embodiments can be combined with each other, and the same or similar concepts or processes may not be repeated in some embodiments.

Figure 2:
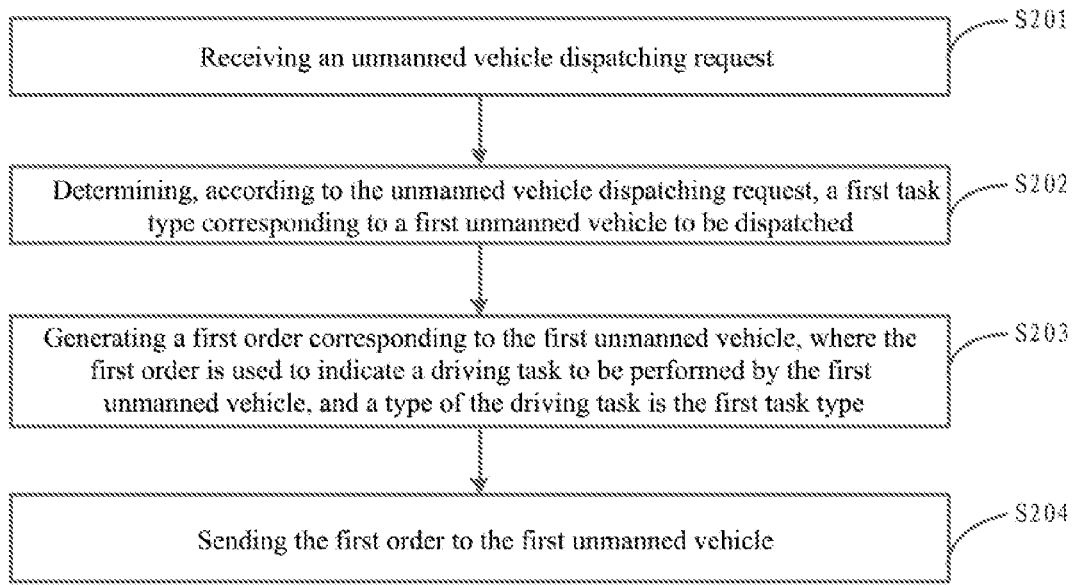
FIG. 2 is a flowchart schematic diagram of a method for unmanned vehicle dispatching management provided by an embodiment of the present disclosure.

FIG. 2 is a flowchart schematic diagram of a method for unmanned vehicle dispatching management provided by an embodiment of the present disclosure. The method of this embodiment may be executed by a server. As demonstrated in FIG. 2, the method provided by this embodiment includes:

S201: Receiving an Unmanned Vehicle Dispatching Request.

The unmanned vehicle dispatching request is used to trigger the unmanned vehicle dispatching management. When the server receives the unmanned vehicle dispatching request, it triggers the execution of the subsequent steps of the present embodiment, so as to realize the unmanned vehicle dispatching management.

In a possible implementation, the unmanned vehicle dispatching request may be a ride request sent by the user equipment. The user equipment may be a terminal device carried by the user, including but not limited to: a mobile phone, a tablet computer, a notebook computer, a smart wearable device, and the like.

Specifically, when a user needs to take a ride, a ride request can be sent to the server through the user equipment. The ride request may include ride demand information. The ride demand information includes, but is not limited to: ride start point information, ride end point information, ride time information, and the like. The ride request may also include user-related information.

In another possible implementation, the unmanned vehicle dispatching request may be an order receiving request sent by the first unmanned vehicle. The first unmanned vehicle may be any unmanned vehicle connected to the server. The type of the first unmanned vehicle can be any type.

Specifically, after the first unmanned vehicle meets the requirement for executing a driving task (for example, the first unmanned vehicle is ready to start, or the first unmanned vehicle has completed the execution of the previous driving task), it sends an order receiving request to the server. The order receiving request includes an identifier of the first unmanned vehicle. The identifier of the first unmanned vehicle may be any information used to uniquely identify the unmanned vehicle. Exemplarily, the identifier of the first unmanned vehicle may be information such as a license plate number, a factory serial number of the vehicle, and the like.

In the embodiment of the present disclosure, the process for unmanned vehicle dispatching management is triggered by an unmanned vehicle dispatching request, and the unmanned vehicle dispatching request may be a ride request sent by a user equipment, or may be an order receiving request sent by a first unmanned vehicle, so that the unmanned vehicle dispatching management process can be triggered by a user or an unmanned vehicle, so as to meet the requirement for dispatching management to different types of unmanned vehicles.

S202: determining, according to the unmanned vehicle dispatching request, a first task type corresponding to a first unmanned vehicle to be dispatched.

In the embodiment of the present disclosure, the driving tasks of the unmanned vehicle can be divided into the following task types: operating type, testing type, and route reception type. The task of an operating type refers to an operating task performed by unmanned vehicles approved by the competent authority to participate in. Among them, according to the grade type of the user involved in the operation, the operating type may further include: important user (very important person, VIP) operating, ordinary operating, trial operating, and the like. The task of the testing type refers to the testing task performed by the road testing/road running unmanned vehicle. The task of a route reception type refers to task performed by an unmanned vehicle that travels along a fixed route in a specific area, for example, from station A to station B. Or, from station A to station B via station C.

It should be noted that this embodiment does not limit the task types listed above, and combined with actual application scenarios, more or fewer task types than those listed above may be included.

The task type corresponding to the first unmanned vehicle can be any one of VIP operating type, ordinary operating type, trial operating type, testing type, and route reception type.

In a possible implementation, when the unmanned vehicle dispatching request is a ride request sent by the user equipment, the ride request includes first indicating information, and the first indicating information is used to indicate a user type of the user to be taken. The user types include but are not limited to: VIP user, ordinary user, trial user, testing user, etc. Exemplarily, the first indicating information may be version information of ride-hailing software installed in the user equipment. For example, if the version of the ride-hailing software is a VIP version, it indicates that the user to be taken is a VIP user; if the version of the ride-hailing software is an ordinary version, it indicates that the user to be taken is an ordinary user; if the version of the ride-hailing software is a trial version, it indicates that the user to be taken is a trial user; if the version of the ride-hailing software is a testing version, it indicates that the user to be taken is a testing user, and so on. It should be noted that the embodiments of the present disclosure do not specifically limit the manner of dividing user types, and the above examples are for illustration.

In this way, the first task type corresponding to the first unmanned vehicle to be dispatched can be determined according to the user type of the user to be taken. In a possible implementation, multiple preset task types and a serviceable user type corresponding to each preset task type are acquired; the first task type is determined from the multiple preset task types according to the user type of the user to be taken, where the serviceable user type corresponding to the first task type includes the user type of the user to be taken.

For example, assuming that the multiple preset task types are: VIP operating type, ordinary operating type, trial operating type, testing type, and route reception type. The serviceable user type corresponding to the VIP operating type includes a VIP user, the serviceable user type corresponding to the ordinary operating type includes an ordinary user, the serviceable user type corresponding to the trial operating type includes a trial user, and the serviceable user type corresponding to the testing type includes a testing user. If the first indicating information carried in the ride request indicates that the user to be taken is a VIP user, the first task type is determined to be a VIP operating type. If the first indicating information carried in the ride request indicates that the user to be taken is a testing user, the first task type is determined to be a testing type.

In another possible implementation, when the unmanned vehicle dispatching request is an order receiving request sent by the first unmanned vehicle, since the order receiving request carries an identifier of the first unmanned vehicle, hence, according to the identifier of the first unmanned vehicle, the first unmanned vehicle to be dispatched can be determined. Further, the task type corresponding to the first unmanned vehicle can be determined according to the identifier of the first unmanned vehicle.

Exemplarily, the server stores the task type corresponding to each unmanned vehicle, for example, stores the following relationship pair <the identifier of the unmanned vehicle, the task type corresponding to the unmanned vehicle>. The task type corresponding to each unmanned vehicle can be pre-assigned by the server for each unmanned vehicle, or can be configured by the administrator to the server according to the requirements of the application scenario. When the server receives the order receiving request of the first unmanned vehicle, according to the identifier of the first unmanned vehicle carried in the order receiving request, the task type corresponding to the first unmanned vehicle can be determined by querying the above relationship pair.

S203: generating a first order corresponding to the first unmanned vehicle, where the first order is used to indicate a driving task to be performed by the first unmanned vehicle, and a type of the driving task is the first task type.

S204: sending the first order to the first unmanned vehicle.

The first order includes relevant information used to describe the driving task to be performed by the first unmanned vehicle, including but not limited to: start point location information, end point location information, departure time information, etc.

In the embodiment of the present disclosure, when the server dispatches the unmanned vehicle, the dispatching is performed based on the order. That is to say, when the server needs to dispatch an unmanned vehicle to perform a driving task, it generates an order for indicating the driving task, and sends the order to the unmanned vehicle, so that the unmanned vehicle can perform the driving task, thereby realizing dispatching of the unmanned vehicle. The order is sent to the first unmanned vehicle, so that the first unmanned vehicle performs the driving task indicated by the first order.

It should be noted that this embodiment does not limit the method of order generating. For several possible examples, please refer to the detailed description of the subsequent embodiments.

In the embodiment of the present disclosure, the first unmanned vehicle may be any type of unmanned vehicle. For example, it can be unmanned taxis, unmanned buses, unmanned inspection vehicles, unmanned sweeping vehicles, unmanned logistics vehicles, unmanned retail vehicles, etc. That is to say, for any type of unmanned vehicle, the method of this embodiment can be used for dispatching management. Therefore, this embodiment realizes compatible support for dispatching management of various types of unmanned vehicles, and reduces the complexity of dispatching management of unmanned vehicles.

The method for unmanned vehicle dispatching management provided by this embodiment includes: receiving an unmanned vehicle dispatching request; determining, according to the unmanned vehicle dispatching request, a first task type corresponding to a first unmanned vehicle to be dispatched; generating a first order corresponding to the first unmanned vehicle, where the first order is used to indicate a driving task to be performed by the first unmanned vehicle, and a type of the driving task is the first task type; and sending the first order to the first unmanned vehicle. Through the above process, the dispatching management of unmanned vehicles is realized from the task dimension, so that there is no need to distinguish the types of unmanned vehicles. That is to say, when any unmanned vehicle needs to be dispatched, no matter what type of the unmanned vehicle, the dispatching management method provided by this embodiment can be used. Hence, the method for unmanned vehicle dispatching management provided by this embodiment can support dispatching management of various types of unmanned vehicles, reducing the complexity of unmanned vehicle dispatching management.

On the basis of the above-mentioned embodiments, the technical solutions provided by the present disclosure will be described in more detail below, combined with specific embodiments.

Figure 3:
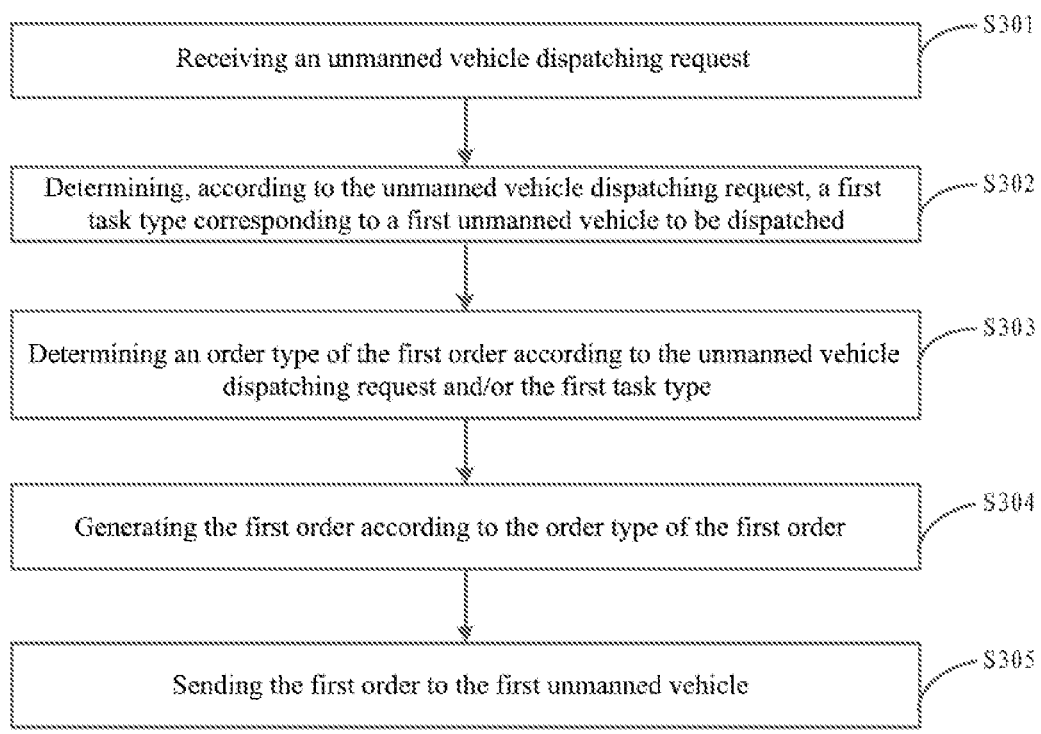
FIG. 3 is a flowchart schematic diagram of another method for unmanned vehicle dispatching management provided by an embodiment of the present disclosure.

FIG. 3 is a flowchart schematic diagram of another method for unmanned vehicle dispatching management provided by an embodiment of the present disclosure. As illustrated in FIG. 3, the method provided in the embodiment includes:

S301: receiving an unmanned vehicle dispatching request;

S302: determining, according to the unmanned vehicle dispatching request, a first task type corresponding to a first unmanned vehicle to be dispatched.

It should be understood that the specific implementation of S301 and S302 is similar to that of S201 and S202 in the embodiment shown in FIG. 2, and details are not repeated here.

S303: determining an order type of the first order according to the unmanned vehicle dispatching request and/or the first task type.

In the present embodiment, the server dispatches the unmanned vehicles based on the order. According to the different ways of order generation, order types can be divided into three types: real user order, virtual user order and route order.

Specifically, for unmanned vehicles whose task types are operating type and testing type, if there is a ride request of the user that triggers the unmanned vehicle to be dispatched, the order type corresponding to the unmanned vehicle is a real user order. When no ride request of the user triggers the unmanned vehicle to be dispatched, the order type corresponding to the unmanned vehicle is a virtual user order. A virtual user order is substantially an order assigned by the server to the unmanned vehicle. When the unmanned vehicle is not assigned a real user order, the driving task can be performed according to the virtual user order. For an unmanned vehicle whose task type is a route reception type, it is generally not necessary for a ride request of the user to trigger the dispatching, and the order type corresponding to the unmanned vehicle is a route order. The route order is substantially also the order assigned by the server to the unmanned vehicle.

In a possible implementation, the order type of the first order can be determined in the following manner: if the unmanned vehicle dispatching request is a ride request sent by the user equipment, then the order type of the first order is determined to be a real user order. If the unmanned vehicle dispatching request is an order receiving request sent by the first unmanned vehicle, and the first task type is a testing type (such as road testing, road running, etc.) or an operating type (for example, VIP operating, ordinary operating, trial operating, etc.), the order type of the first order is determined to be a virtual user order. If the unmanned vehicle dispatching request is an order receiving request sent by the first unmanned vehicle, and the first task type is a route reception type, the order type of the first order is determined to be a route order.

S304: generating the first order according to the order type of the first order.

S305: sending the first order to the first unmanned vehicle.

In the present embodiment, different order types may correspond to different order generation methods. The following describes how to generate the first order for each order type.

In a possible implementation, if the order type of the first order is a real user order, the first order is generated as follows:

(1) determining user information and ride demand information of a user to be taken according to a ride request sent by a user equipment, where the ride demand information includes at least one of the following: ride start point information, ride end point information, ride time information. The user information of the user to be taken includes but is not limited to: the identifier of a user, the contact information of a user, the current location of a user, etc.

(2) determining the driving task according to the ride demand information.

In this implementation, since it is a dispatching process triggered by a ride request sent by the user equipment, the first unmanned vehicle also needs to be determined when a driving task is generated. The process of determining the first unmanned vehicle can be understood as the process of "finding a car", that is, the process of "assigning an unmanned vehicle to a user order", or the process of "assigning a user order to an unmanned vehicle".

In this implementation, since the first task type corresponding to the first unmanned vehicle has been determined in S302, the first unmanned vehicle to be dispatched can be determined according to the first task type.

Specifically, multiple candidate unmanned vehicles are determined according to the first task type, and the task types corresponding to the multiple candidate unmanned vehicles are the first task type. That is to say, among all the unmanned vehicles connected to the server, the unmanned vehicles whose corresponding task type is the first task type are determined as candidate unmanned vehicles. Further, from the multiple candidate unmanned vehicles, the first unmanned vehicle to be dispatched is determined.

Exemplarily, an order dispatching strategy may be set in the server, and in the process of "finding a car", the first unmanned vehicle to be dispatched may be determined according to the order dispatching strategy. For example, the order dispatching strategy includes one or more of the following: a minimum distance strategy, a fastest time strategy, a maximum value strategy, an optimal waiting strategy, and the like. The server may determine the first unmanned vehicle to be dispatched from multiple candidate unmanned vehicles according to one or more of the above strategies.

Further, after determining the first unmanned vehicle to be dispatched, a driving task to be performed by the first unmanned vehicle is generated according to the current location information of the first unmanned vehicle and the ride demand information, the driving task includes target route information, and the target route information includes: current location information, ride start point information, and ride end point information. That is, the target route information indicates how the first unmanned vehicle reaches the ride location of the user from the current location, and how to reach the ride end point of the user from the ride start point of the user.

(3) generating the first order according to the user information and the driving task.

In the present embodiment, when the order type of the first order is a real user order, the first order can not only indicate the driving task (such as the driving route) of the first unmanned vehicle, but also indicate the user information associated with the driving task.

In another possible implementation, if the order type of the first order is a virtual user order, the first order is generated as follows:
  (1) generating the driving task corresponding to the first task type according to the first task type, where the driving task comprises at least one first driving route, each first driving route comprises start station information and end station information.

In an example, if the first task type is an operating type (for example, VIP operating, ordinary operating, trial operating, etc.), the real-time position of the first unmanned vehicle is acquired, a first driving route is determined according to the real-time location of the first unmanned vehicle, and a driving task is generated according to the first driving route.

The server may plan and generate the first driving route according to the real-time position of the first unmanned vehicle. Alternatively, the server may pre-configure multiple virtual routes, and each virtual route includes start station information and end station information. When determining the first driving route, one virtual route may be selected from the multiple virtual routes as the first driving route.

In a possible implementation, a virtual route real-time generating strategy or a virtual route real-time selecting strategy can also be set in the server, for example, a virtual route is generated/selected in real time according to the principle of closest distance, or a virtual route is generated/selected in real time according to the principle of road patency, etc.

In another example, if the first task type is a testing type (for example, road testing, road running, etc.), a testing area range of the first unmanned vehicle is acquired, and multiple first driving routes are determined according to the testing area range, and a driving task is generated according to the multiple first driving routes.

In this example, the multiple first driving routes can be generated in batches, so that the first unmanned vehicle can complete the testing of the multiple first driving routes in batches when performing the driving task.

Similar to the above example, when determining multiple first driving routes, multiple first driving routes can be planned and generated according to the testing area range of the first unmanned vehicle. Alternatively, the server may pre-configure multiple testing area ranges and multiple virtual routes corresponding to each testing area range, and select partial of routes as the multiple first driving routes from the multiple virtual routes corresponding to the testing area range of the first unmanned vehicle.

In a possible implementation, a batch generating strategy for a virtual route or a batch selecting strategy for a virtual route can also be set in the server, for example, virtual routes are generated/selected in batches according to the principle of least overlap, or virtual routes are generated/selected in batches according to the principle of maximum coverage, etc.

(2) generating the first order according to the driving task.

In the present embodiment, when the order type of the first order is a virtual user order, the first order indicates the driving task of the first unmanned vehicle (for example, one or more first driving routes).

In another possible implementation, if the order type of the first order is a route order, the first order is generated as follows:
  (1) acquiring route configuration information corresponding to the first unmanned vehicle according to an identifier of the first unmanned vehicle.

In this implementation, when the task type specified by the server for an unmanned vehicle is a route reception type, the server can also configure route configuration information for the unmanned vehicle, where the route configuration information instruct the vehicle to travel along the specified route. When the first unmanned vehicle sends an order receiving request to trigger the dispatching management of the first unmanned vehicle, the order receiving request includes the identifier of the first unmanned vehicle. The route configuration information corresponding to first unmanned vehicle can be acquired according to the identifier of the first unmanned vehicle.
  (2) generating the driving task according to the route configuration information, where the driving task comprises a second driving route, and the second driving route comprises start station information, end station information and at least one piece of intermediate station information.

In a possible implementation, the route configuration information includes at least one candidate driving route, or multiple pieces of station information.

When the route configuration information includes one candidate driving route, the candidate driving route may be determined as the second driving route.

When the route configuration information includes multiple candidate driving routes, the second driving route may be determined from the multiple candidate driving routes. For example, any one of the multiple candidate driving routes is determined as the second driving route.

When the route configuration information includes multiple pieces of station information, the second driving route may be determined according to all or partial of the station information in the multiple pieces of station information.

Further, a driving task to be performed by the first unmanned vehicle may be generated according to the determined second driving route. In a possible implementation, the driving task to be performed by the first unmanned vehicle may be generated according to the determined second driving route and the number of repetitions. For example, assuming that the number of repetitions is 3, it means that the first unmanned vehicle needs to drive along the second driving route 3 times.
  (3) generating the first order according to the driving task.

In the present embodiment, when the order type of the first order is a route order, the first order indicates a driving task of the first unmanned vehicle (for example, the above-mentioned second driving route).

In the present embodiment, by applying unmanned vehicle dispatching management from the task dimension, the method of this embodiment can support dispatching management of various types of unmanned vehicles. Further, in the present embodiment, three order types (real user order, virtual user order, and route order) and the corresponding generating method for each order are designed according to different triggering methods of the unmanned vehicle dispatching request and/or the task types corresponding to the first unmanned vehicle to be dispatched. In this way, this embodiment performs dispatching management based on orders when performing dispatching management on various types of unmanned vehicles, and unifies the dispatching management methods for different types of unmanned vehicles. Further, in the subsequent analysis and statistics of the driving data of the unmanned vehicle, the analysis and statistics can be performed based on the order dimension, which provides convenience for the statistical analysis of the data.

On the basis of any of the above-mentioned embodiments, the dispatching management process of the unmanned vehicle provided by the present disclosure is exemplified below with reference to FIG. 4.

Figure 4:
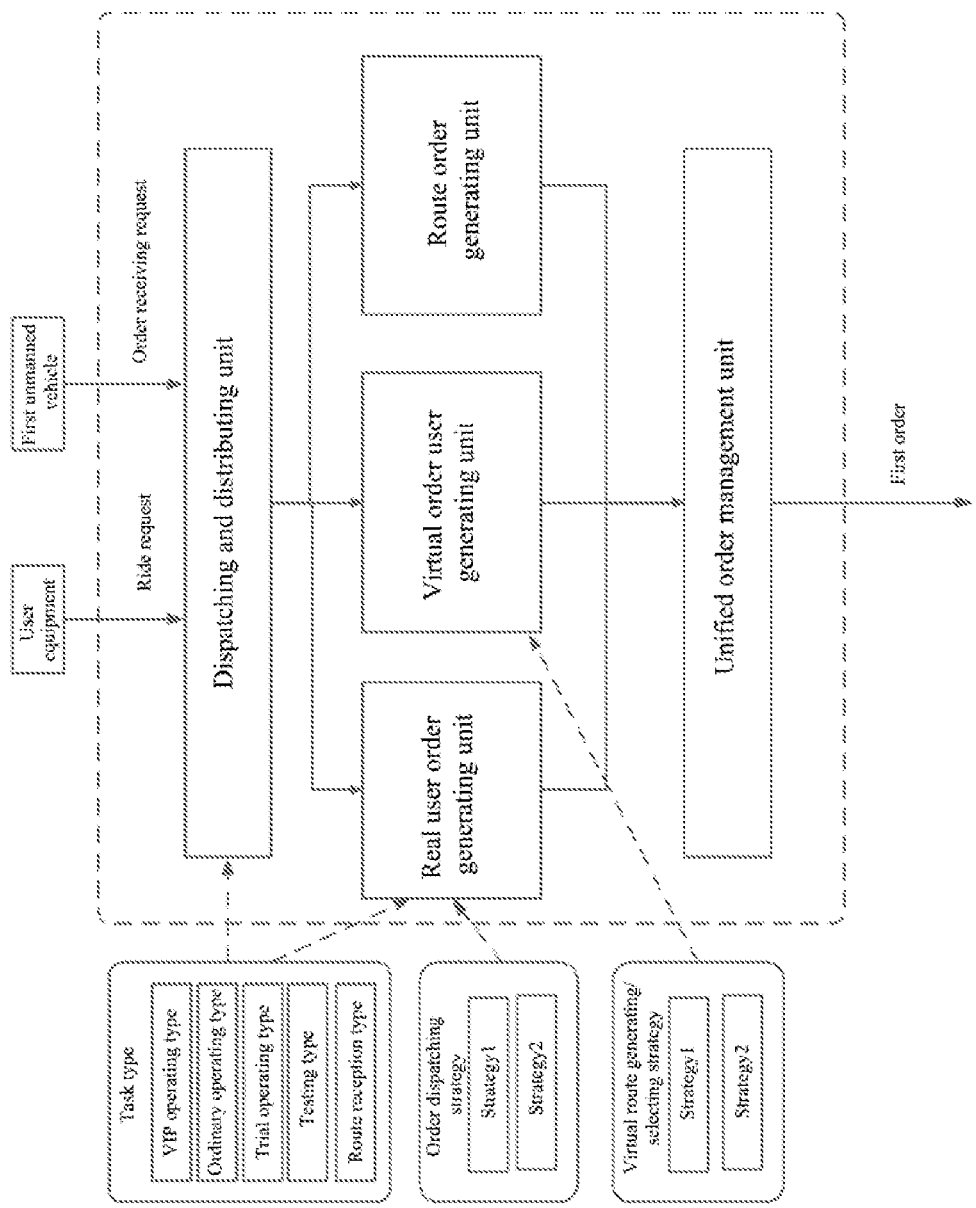
FIG. 4 is a schematic diagram of a process for unmanned vehicle dispatching management provided by an embodiment of the present disclosure.

FIG. 4 is a schematic diagram of a process for unmanned vehicle dispatching management provided by an embodiment of the present disclosure. As illustrated in FIG. 4, assuming that the tasks are divided into the following task types: VIP operating type, ordinary operating type, trial operating type, testing type, and route reception type. The server is provided with a dispatching and distributing unit, a real user order generating unit, a virtual order user generating unit, a route order generating unit, and a unified order management unit.

Referring to FIG. 4, in a scenario, the dispatching and distributing unit receives a ride request sent by the user equipment, where the ride request includes user information and ride demand information of the user to be taken. The user information includes first indicating information, which is used to indicate the user type of the user to be taken, and the dispatching and distributing unit determines, according to the user type of the user to be taken, the first task type corresponding to the first unmanned vehicle to be dispatched and distributes the first task type, the user information and the ride demand information to the real user order generating unit.

Further referring to FIG. 4, in the real user order generating unit, the first unmanned vehicle is determined according to the first task type; then a driving task is generated according to the ride demand information of the user to be taken and the current location of the first unmanned vehicle, where the driving task includes a target driving route, and the target driving route includes: the current location information, the ride start point information, and the ride end point information. In this way, the first order is generated according to the user information and the driving task. The real user order generating unit sends the first order to the unified order management unit, and the unified order management unit sends the first order to the first unmanned vehicle. When the real user order generating unit determines the first unmanned vehicle, it may be performed according to the order dispatching strategy.

Further referring to FIG. 4, in another scenario, the dispatching and distributing unit receives the order receiving request sent by the first unmanned vehicle, and the order receiving request includes the identifier of the first unmanned vehicle. The first task type corresponding to the first unmanned vehicle is determined according to the identifier of the first unmanned vehicle. If the first task type is any one of the following task types: VIP operating type, ordinary operating type, trial operating type, and testing type, the identifier of the first unmanned vehicle and the first task type are distributed to the virtual user order generating unit. If the first task type is the route reception type, the identifier of the first unmanned vehicle is distributed to the route order generating unit.

Further referring to FIG. 4, in the virtual user order generating unit, if the first task type is any one of the VIP operating type, the ordinary operating type, and the trial operating type, then a real-time location of an unmanned vehicle is determined according to the identifier of the first unmanned vehicle; a first driving route is determined according to the real-time location of the first unmanned vehicle; and a driving task to be performed by the first unmanned vehicle is generated according to the first driving route. If the first task type is a testing type, a testing area range of the first unmanned vehicle is acquired according to the identifier of the first unmanned vehicle; multiple first driving routes are determined according to the testing area range of the first unmanned vehicle; and a driving task to be performed by the first unmanned vehicle is generated according to the multiple first driving routes. A first order is generated according to the driving task. The virtual user order generating unit sends the first order to the unified order management unit, and the unified order management unit sends the first order to the first unmanned vehicle. When the virtual user order generating unit determines the first driving route, it may be performed according to the virtual route generating/selecting strategy.

Further referring to FIG. 4, in the route order generating unit, according to the identifier of the first unmanned vehicle, the route configuration information corresponding to the first unmanned vehicle is acquired. If the route configuration information includes at least one candidate driving route, the second driving route is determined from the at least one candidate driving route; if the route configuration information includes multiple pieces of station information, the second driving route is determined according to all or partial of the station information in the multiple pieces of station information; and a driving task to be performed by the first unmanned vehicle is generated according to the determined second driving route. In this way, the first order is generated according to the driving task. The route order generating unit sends the first order to the unified order management unit, and the unified order management unit sends the first order to the first unmanned vehicle.

The order-based dispatching management process for unmanned vehicles provided in the present embodiment can be decoupled from the order dispatching strategy and the virtual route generating/selecting strategy. Moreover, a variety of strategies can be flexibly deployed according to actual application scenarios, which improves implementation flexibility.

On the basis of any of the foregoing embodiments, an embodiment of the present disclosure further provides a schematic diagram of the architecture a platform for unmanned vehicle dispatching management. The following description will be made with reference to FIG. 5.

Figure 5:
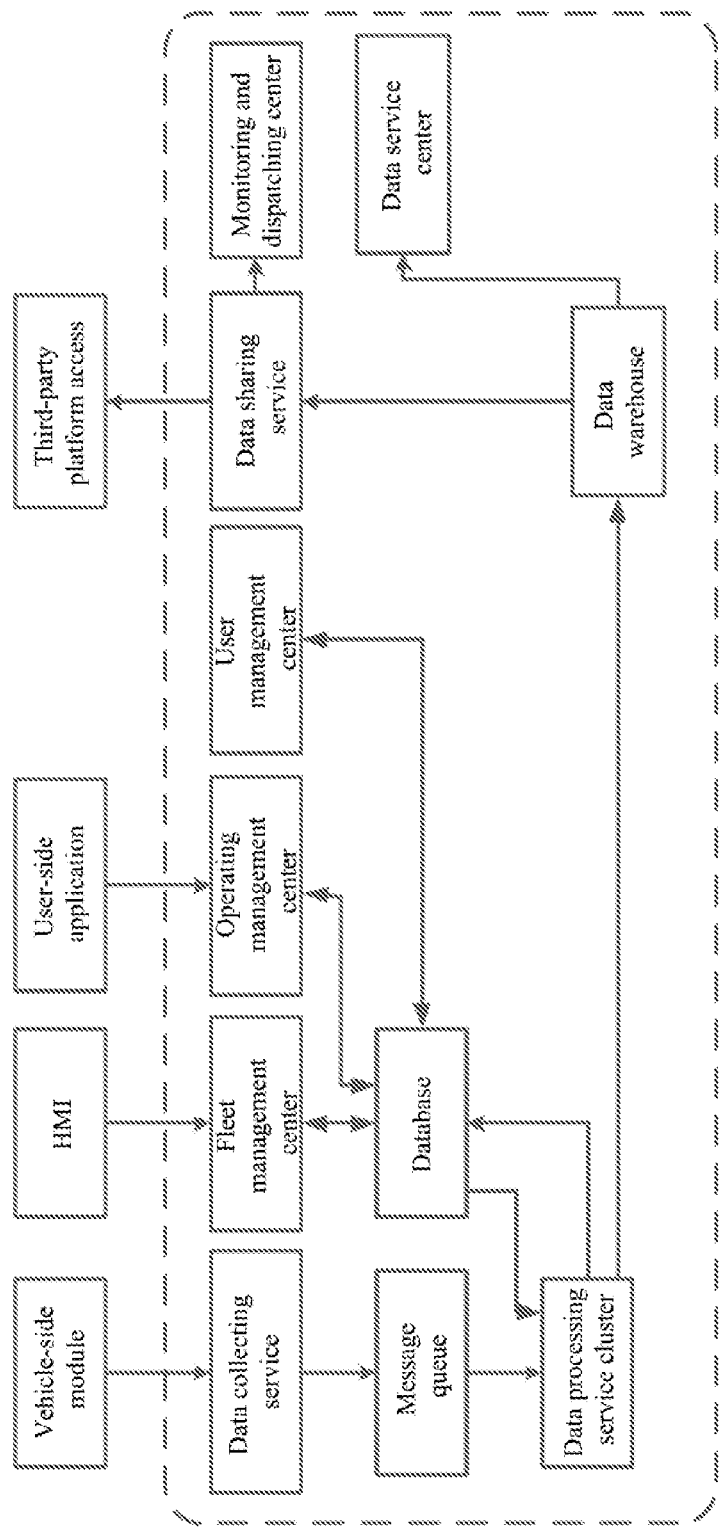
FIG. 5 is a schematic diagram of the architecture of a platform for unmanned vehicle dispatching management provided by an embodiment of the present disclosure.

FIG. 5 is a schematic diagram of the architecture of a platform for unmanned vehicle dispatching management provided by an embodiment of the present disclosure. As demonstrated in FIG. 5, the platform for unmanned vehicle dispatching management includes: fleet management center, operating management center, user management center, monitoring and dispatching center, data service center, data collecting service, data sharing service, data processing service cluster, message queue, database, and data warehouse.

As demonstrated in FIG. 5, the data collecting service is communicatively connected with the vehicle-side module to collect real-time data of the unmanned vehicle, for example, the location information of the unmanned vehicle. According to the different types of data collected, the data collected is distributed to different message queues. The data processing service processes the data in different message queues respectively, and synchronizes the processed data to the data warehouse. During data processing, the data processing service can obtain data from the database, or synchronize the processed data to the database.

The database is mainly used for persistently storing business data and support diversified data storage. The data warehouse is mainly used for decoupling from online business data, and the data in the data warehouse can be used for big data analysis, that is, data visualization.

The fleet management center is used to support the operation and maintenance management of various types of unmanned vehicles, and can send orders to unmanned vehicles through HMI (Human Machine Interface). The operating management center is used to support the operation of unmanned vehicles, which can reach users and receive ride requests sent by the user equipment (user-side application). The user management center is used to realize the management to the user, such as the management of user accounts and permissions. The business data generated by the fleet management center, the operating management center, and the user management center are stored in the database, or the fleet management center, the operating management center, and the user management center can obtain business data from the database.

The data sharing service is used to provide a unified interface layer, support third-party platform access, and realize data sharing. The third-party platform can be connected to the platform for unmanned vehicle dispatching management, and acquire the data in the data warehouse through the data sharing service.

The monitoring and dispatching center is used for real-time capacity monitoring, pre-warning, and data retrospective analysis.

The data service center is used to customize data reports, perform statistical analysis and presentation of the data in the data warehouse, etc.

The method for unmanned vehicle dispatching management provided by the embodiment of the present disclosure can be collaboratively executed by the fleet management center and the operating management center in FIG. 5.

Figure 6:
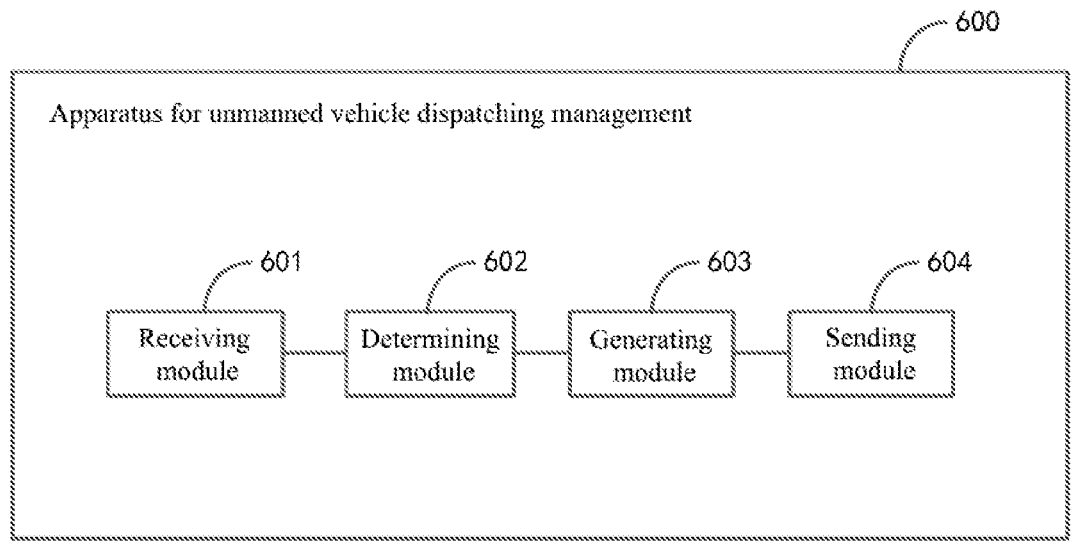
FIG. 6 is a schematic structural diagram of an apparatus for unmanned vehicle dispatching management provided by an embodiment of the present disclosure.

FIG. 6 is a structure schematic diagram of an apparatus for unmanned vehicle dispatching management provided by an embodiment of the present disclosure. The apparatus for unmanned vehicle dispatching management provided in the present embodiment may be in the form of software and/or hardware. As shown in FIG. 6, the apparatus for unmanned vehicle dispatching management 600 provided in the present embodiment may include: a receiving module 601, a determining module 602, a generating module 603, and a sending module 604.

The receiving module 601 is configured to receive an unmanned vehicle dispatching request;

The determining module 602 is configured to determine, according to the unmanned vehicle dispatching request, a first task type corresponding to a first unmanned vehicle to be dispatched;

The generating module 603 is configured to generate a first order corresponding to the first unmanned vehicle, where the first order is used to indicate a driving task to be performed by the first unmanned vehicle, and a type of the driving task is the first task type; and The sending module 604 is configured to send the first order to the first unmanned vehicle.

In one possible implementation, the generating module 603 includes:
  a first determining unit, configured to determine an order type of the first order according to the unmanned vehicle dispatching request and/or the first task type; and
  a generating unit, configured to generate the first order according to the order type of the first order.

In a possible implementation, the first determining unit is specifically configured to:

when the unmanned vehicle dispatching request is a ride request sent by a user equipment, determine the order type of the first order is a real user order; or, when the unmanned vehicle dispatching request is an order receiving request sent by the first unmanned vehicle, and the first task type is a testing type or an operating type, determine the order type of the first order is a virtual user order; or when the unmanned vehicle dispatching request is an order receiving request sent by the first unmanned vehicle, and the first task type is a route reception type, determine the order type of the first order is a route order.

In a possible implementation, the order type of the first order is real user order, the generating unit includes:
  a first determining sub-unit, configured to determine user information and ride demand information of a user to be taken according to the ride request, where the ride demand information comprises ride start point information and ride end point information;
  a second determining sub-unit, configured to determine the driving task according to the ride demand information; and
  a first generating sub-unit, configured to generate the first order according to the user information and the driving task.

In a possible implementation, the second determining sub-unit is specifically configured to:
  determine the first unmanned vehicle to be dispatched according to the first task type;
  generate the driving task according to a current location information of the first unmanned vehicle and the ride demand information, where the driving task comprises a target driving route, and the target driving route comprises the current location information, the ride start point information, and the ride end point information.

In a possible implementation, the second determining sub-unit is specifically configured to:
  determine multiple candidate unmanned vehicles according to the first task type, where task types corresponding to the multiple candidate unmanned vehicles are all the first task type; and
  determine the first unmanned vehicle to be dispatched from the multiple candidate unmanned vehicles.

In a possible implementation, the order type of the first order is the virtual user order, the generating unit includes:
  a second generating sub-unit, configured to generate the driving task corresponding to the first task type according to the first task type, where the driving task comprises at least one first driving route, each first driving route comprises start station information and end station information; and
  a third generating sub-unit, configured to generate the first order according to the driving task.

In a possible implementation, the second generating sub-unit is specifically configured to:
  when the first task type is the operating type, acquire a real-time location of the first unmanned vehicle; determine a first driving route according to the real-time location of the first unmanned vehicle; and generate the driving task according to the first driving route;
  or,
  when the first task type is testing type, acquire a testing area range of the first unmanned vehicle; determine multiple first driving routes according to the testing area range of the first unmanned vehicle; and generate the driving task according to the multiple first driving routes.

In a possible implementation, the order type of the first order is the route order, the generating unit includes:
- an acquiring sub-unit, configured to acquire route configuration information corresponding to the first unmanned vehicle according to an identifier of the first unmanned vehicle;
- a fourth generating sub-unit, configured to generate the driving task according to the route configuration information, where the driving task comprises a second driving route, and the second driving route comprises start station information, end station information and at least one piece of intermediate station information; and
- a fifth generating sub-unit, configured to generate the first order according to the driving task.

In a possible implementation, the route configuration information includes at least one candidate driving route, or multiple pieces of station information, the fourth generating sub-unit is specifically configured to:
- determine the second driving route from the at least one candidate driving route; or, determine the second driving route according to all or part of the multiple pieces of station information; and
- generate the driving task according to the second driving route.

In a possible implementation, the unmanned vehicle dispatching request is the ride request sent by the user equipment, where the ride request comprises first indicating information, and the first indicating information is used to indicate a user type of the user to be taken; the determining module 602 includes:
- an acquiring unit, configured to acquire multiple preset task types, and a serviceable user type corresponding to each preset task type;
- a second determining unit, configured to determine the first task type from the multiple preset task types according to the user type of the user to be taken, where the serviceable user type corresponding to the first task type comprises the user type of the user to be taken.

In a possible implementation, the unmanned vehicle dispatching request is the order receiving request sent by the first unmanned vehicle, and the order receiving request comprises an identifier of the first unmanned vehicle; the determining module 602 includes:
- a third determining unit, configured to determine the first task type corresponding to the first unmanned vehicle to be dispatched according to the identifier of the first unmanned vehicle.

The apparatus for unmanned vehicle dispatching management provided by this embodiment can be used to execute the method for unmanned vehicle dispatching management provided in the any one of the above-mentioned method embodiments, and the implementation principles and technical effects therebetween are similar, which are not repeated here.

In the technical solution of the present disclosure, the acquisition, storage and application of the personal information of the user involved all comply with the provisions of relevant laws and regulations, and do not violate public order and good customs.

According to an embodiment of the present disclosure, the present disclosure also provides an electronic device, a readable storage medium and a computer program product.

According to an embodiment of the present disclosure, the present disclosure also provides a computer program product, which includes: a computer program, the computer program is stored in a readable storage medium, at least one processor of the electronic device can read the computer program stored from the computer-readable storage medium, the computer program is executed by the at least one processor to enable the electronic device to execute the solution provided by any of the above embodiments.

Figure 7:
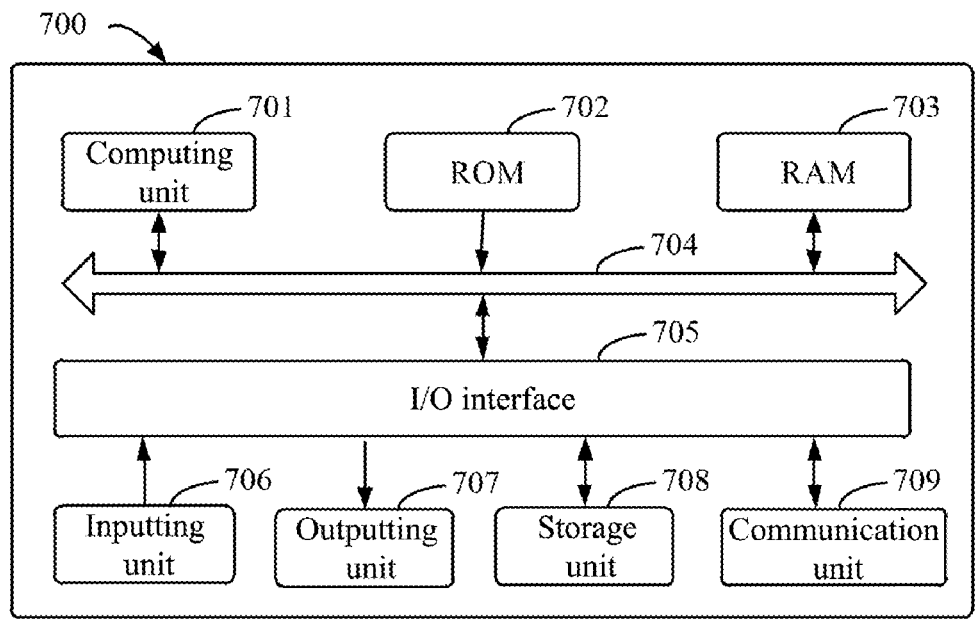
FIG. 7 is a schematic structural diagram of an electronic device provided by an embodiment of the present disclosure.

FIG. 7 shows a schematic block diagram of an exemplary electronic device 700 that can be used to implement an embodiment of the present disclosure. The electrical devices are intended to represent various forms of digital computers, such as laptop computers, desktop computers, workstations, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown herein, their connections and relationships, and their functions are merely examples, and are not intended to limit the implementation of the present disclosure described and/or required herein.

As shown in FIG. 7, the electronic device 700 includes a computing unit 701, which can be based on a computer program stored in a read only memory (ROM) 702 or loaded from a storage unit 708 to a random access memory (RAM) 703 to perform various appropriate actions and processing. In the RAM 703, various programs and data required for the operation of the device 700 can also be stored. The computing unit 701, the ROM 702, and the RAM 703 are connected to each other through a bus 704. The inputting/outputting (I/O) interface 705 is also connected to the bus 704.

Multiple components in the device 700 are connected to the I/O interface 705, including: an inputting unit 706, such as a keyboard, a mouse, etc.; an outputting unit 707, such as various types of displays, speakers, etc.; and a storage unit 708, such as a disk, optical disc, etc.; and a communication unit 709, such as network card, modem, wireless communication transceiver, etc. The communication unit 709 allows the device 700 to exchange information/data with other devices through a computer network such as the Internet and/or various telecommunication networks.

The computing unit 701 may be various general-purpose and/or special-purpose processing components with processing and computing capabilities. Some examples of the computing unit 701 include, but are not limited to, a central processing unit (CPU), a graphics processing unit (GPU), various dedicated artificial intelligence (AI) computing chips, various computing units that run machine learning model algorithms, and digital signal processing (DSP), and any appropriate processor, controller, micro-controller, etc. The computing unit 701 executes the various methods and processes described above, for example, a route processing method. For example, in some embodiments, the route processing method may be implemented as a computer software program, which is tangibly contained in a machine-readable medium, such as the storage unit 708. In some embodiments, partial or all of the computer program may be loaded and/or installed on the device 700 via the ROM 702 and/or the communication unit 709. When the computer program is loaded into the RAM 703 and executed by the computing unit 701, one or more steps of the route processing method described above can be executed. Alternatively, in other embodiments, the computing unit 701 may be configured to execute the route processing method in any other suitable manner (for example, by means of firmware).

Various implementations of the systems and technologies described above in the present disclosure can be implemented in digital electrical circuit systems, integrated circuit systems, field programmable gate arrays (FPGA), application specific integrated circuits (ASIC), application-specific standard products (ASSP), a system on chip system (SOC), complex programmable logic device (CPLD), computer hardware, firmware, software, and/or a combination thereof. These various embodiments may include: being implemented in one or more computer programs, the one or more computer programs may be executed and/or interpreted on a programmable system including at least one programmable processor, the programmable processor can be a dedicated or general-purpose programmable processor that can receive data and instructions from the storage system, at least one input device, and at least one output device, and transmit the data and instructions to the storage system, the at least one input device, and the at least one output device.

The program code used to implement the method of the present disclosure can be written in any combination of one or more programming languages. These program codes can be provided to the processors or controllers of general-purpose computers, special-purpose computers, or other programmable data processing devices, so that the program codes, when executed by the processors or controllers, enable the function/operation specified in the flowcharts and/or block diagrams is implemented. The program code can be executed entirely on the machine, partly executed on the machine, partly executed on the machine and partly executed on the remote machine as an independent software package, or entirely executed on the remote machine or server.

In the context of the present disclosure, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electrical, magnetic, optical, electromagnetic, infrared, or semiconductor system, apparatus, or device, or any suitable combination of the foregoing. More specific examples of machine-readable storage medium would include electrical connections based on one or more wires, portable computer disks, hard disks, random access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

In order to provide interaction with the user, the system and technology described here can be implemented on a computer that has: a display device for displaying information to the user (for example, a CRT (cathode ray tube) or LCD (liquid crystal display) monitor); and a keyboard and pointing device (for example, a mouse or a trackball) through which the user can provide input to the computer. Other types of devices can also be used to provide interaction with the user; for example, the feedback provided to the user can be any form of sensory feedback (for example, visual feedback, auditory feedback, or tactile feedback); and can be in any form (including acoustic input, voice input, or tactile input) to receive input from the user.

The systems and technologies described herein can be implemented in a computing system that includes back-end components (for example, as a data server), or a computing system that includes intermediate components (for example, an application server), or a computing system that includes front-end components (For example, a user computer with a graphical user interface or a web browser, through which the user can interact with the implementation of the system and technology described herein), or include such back-end components, intermediate components, or any combination of front-end components in a computing system. The components of the system can be connected to each other through any form or medium of digital data communication (for example, a communication network). Examples of communication networks include: local area network (LAN), wide area network (WAN), and the Internet.

The computer system may include a client and a server. The client and server are generally far away from each other and usually interact through a communication network. The relationship between the client and the server is generated by computer programs that run on the corresponding computers and have a client-server relationship with each other. The server can be a cloud side server, also known as a cloud side computing server or a cloud side host. It is a host product in the cloud side computing service system to solve the existing shortcomings of difficult management and weak business scalability in traditional physical host and VPS service ("Virtual Private Server", or "VPS" for short). The server can also be a server of a distributed system, or a server combined with a block-chain.

It should be understood that the various forms of processes shown above can be used to reorder, add or delete steps. For example, the steps described in the present application can be executed in parallel, sequentially, or in a different order, as long as the desired result of the technical solution disclosed in the present disclosure can be achieved, this is not limited herein.

The above specific implementations do not constitute a limitation on the protection scope of the present disclosure. Those skilled in the art should understand that various modifications, combinations, sub-combinations and substitutions can be made according to design requirements and other factors. Any modification, equivalent replacement and improvement made within the spirit and principle of this disclosure shall be included in the protection scope of this disclosure.

What is claimed is:

1. A method for unmanned vehicle dispatching management, comprising:
receiving a first unmanned vehicle dispatching request;
determining, according to the first unmanned vehicle dispatching request, a first task type corresponding to a first unmanned vehicle to be dispatched;
generating a first order corresponding to the first unmanned vehicle, wherein the first order is used to indicate a first driving task to be performed by the first unmanned vehicle, and a type of the first driving task is the first task type; and
sending the first order to the first unmanned vehicle;
determining that the first unmanned vehicle dispatching request is a ride request sent by user equipment, wherein, in response to determining the first unmanned vehicle dispatching request is the ride request, the ride request comprises first indicating information, and the first indicating information is used to indicate a user type of a user to be taken; and the determining, according to the first unmanned vehicle dispatching request, the first task type corresponding to the first unmanned vehicle to be dispatched comprises:

acquiring multiple preset task types and a serviceable user type corresponding to each preset task type; and determining the first task type from the multiple preset task types according to the user type of the user to be taken, wherein the serviceable user type corresponding to the first task type comprises the user type of the user to be taken;

wherein the generating the first order corresponding to the first unmanned vehicle comprises:

determining a first order type, from a plurality of order types, of the first order according to the first unmanned vehicle dispatching request and the first task type; and generating the first order according to the first order type of the first order; and receiving a second unmanned vehicle dispatching request;

determining, according to the second unmanned vehicle dispatching request, a second task type corresponding to a second unmanned vehicle to be dispatched;

generating a second order corresponding to the second unmanned vehicle, wherein the second order is used to indicate a second driving task to be performed by the second unmanned vehicle, and a type of the second driving task is the second task type; and sending the second order to the second unmanned vehicle;

determining that the second unmanned vehicle dispatching request is an order receiving request sent by the second unmanned vehicle, wherein, in response to determining the second unmanned vehicle dispatching request is the order receiving request, the order receiving request comprises an identifier of the second unmanned vehicle; and the determining, according to the second unmanned vehicle dispatching request, the second task type corresponding to the second unmanned vehicle to be dispatched comprises:

determining the second task type corresponding to the second unmanned vehicle to be dispatched according to the identifier of the second unmanned vehicle;

wherein the generating the second order corresponding to the second unmanned vehicle comprises:

determining a second order type, from the plurality of order types, of the second order according to the second unmanned vehicle dispatching request and the second task type; and generating the second order according to the second order type of the second order.

2. The method according to claim 1, wherein the determining the first order type, from the plurality of order types, of the first order according to the first unmanned vehicle dispatching request and the first task type comprises:

determining the first order type of the first order is a real user order.

3. The method according to claim 2, wherein the first order type of the first order is the real user order, the generating the first order according to the first order type of the first order comprises:

determining user information and ride demand information of the user to be taken according to the ride request, wherein the ride demand information comprises ride start point information and ride end point information;

determining the first driving task according to the ride demand information; and generating the first order according to the user information and the first driving task.

4. The method according to claim 3, wherein the determining the first driving task according to the ride demand information comprises:

determining the first unmanned vehicle to be dispatched according to the first task type; and generating the first driving task according to a current location information of the first unmanned vehicle and the ride demand information, wherein the first driving task comprises a target driving route, and the target driving route comprises the current location information, the ride start point information, and the ride end point information.

5. The method according to claim 4, wherein the determining the first unmanned vehicle to be dispatched according to the first task type comprises:

determining multiple candidate unmanned vehicles according to the first task type, wherein task types corresponding to the multiple candidate unmanned vehicles are all the first task type; and determining the first unmanned vehicle to be dispatched from the multiple candidate unmanned vehicles.

6. The method according to claim 1, wherein the determining the second order type of the second order according to the second unmanned vehicle dispatching request and the second task type comprises:

in response to determining that the second task type is a testing type or an operating type, determining the second order type of the second order is a virtual user order; or in response to determining that the second task type is a route reception type, determining the second order type of the second order is a route order.

7. The method according to claim 6, wherein the second order type of the second order is the virtual user order, the generating the second order according to the second order type of the second order comprises:

generating the second driving task corresponding to the second task type according to the second task type, wherein the second driving task comprises at least one first driving route, each first driving route comprises start station information and end station information; and generating the second order according to the second driving task.

8. The method according to claim 7, wherein the generating the second driving task corresponding to the second task type according to the second task type comprises:

in response to determining that the second task type is the operating type, acquiring a real-time location of the second unmanned vehicle; determining a first driving route according to the real-time location of the second unmanned vehicle; and generating the second driving task according to the first driving route;

or, in response to determining that the second task type is the testing type, acquiring a testing area range of the second unmanned vehicle; determining multiple first driving routes according to the testing area range of the second unmanned vehicle; and generating the second driving task according to the multiple first driving routes.

9. The method according to claim 6, wherein the second order type of the second order is the route order, the generating the second order according to the second order type of the second order comprises:

acquiring route configuration information corresponding to the second unmanned vehicle according to the identifier of the second unmanned vehicle;

generating the second driving task according to the route configuration information, wherein the second driving task comprises a second driving route, and the second driving route comprises start station information, end station information and at least one piece of intermediate station information; and generating the second order according to the driving task.

10. The method according to claim 9, wherein the route configuration information comprises at least one candidate driving route, or multiple pieces of station information, the generating the second driving task according to the route configuration information comprises:
   determining the second driving route from the at least one candidate driving route; or, determining the second driving route according to all or part of the multiple pieces of station information; and
   generating the second driving task according to the second driving route.

11. An electronic device comprising:
   at least one processor; and
   a memory communicatively connected with the at least one processor;
   wherein the memory is stored with instructions executable by the at least one processor, and the instructions are executed by the at least one processor to enable the at least one processor to:
   receive an unmanned vehicle dispatching request;
   determine, according to the unmanned vehicle dispatching request, a first task type corresponding to a first unmanned vehicle to be dispatched;
   generate a first order corresponding to the first unmanned vehicle, wherein the first order is used to indicate a driving task to be performed by the first unmanned vehicle, and a type of the driving task is the first task type; and
   send the first order to the first unmanned vehicle;
   wherein in a case that the unmanned vehicle dispatching request is a ride request sent by user equipment, the ride request comprises first indicating information, and the first indicating information is used to indicate a user type of a user to be taken; and the instructions are executed by the at least one processor to enable the at least one processor to:
   acquire multiple preset task types, and a serviceable user type corresponding to each preset task type;
   determine the first task type from the multiple preset task types according to the user type of the user to be taken, wherein the serviceable user type corresponding to the first task type comprises the user type of the user to be taken; and
   in a case that the unmanned vehicle dispatching request is an order receiving request sent by the first unmanned vehicle, the order receiving request comprises an identifier of the first unmanned vehicle, and the instructions are executed by the at least one processor to enable the at least one processor to:
   determine the first task type corresponding to the first unmanned vehicle to be dispatched according to the identifier of the first unmanned vehicle;
   wherein the instructions are executed by the at least one processor to enable the at least one processor to:
   determine an order type, from a plurality of order types, of the first order according to the unmanned vehicle dispatching request and the first task type; and
   generate the first order according to the order type of the first order.

12. A non-transitory computer-readable storage medium stored with computer instructions, wherein the computer instructions are configured to enable a computer to:
   receive an unmanned vehicle dispatching request;
   determine, according to the unmanned vehicle dispatching request, a first task type corresponding to a first unmanned vehicle to be dispatched;
   generate a first order corresponding to the first unmanned vehicle, wherein the first order is used to indicate a driving task to be performed by the first unmanned vehicle, and a type of the driving task is the first task type; and
   send the first order to the first unmanned vehicle;
   wherein in a case that the unmanned vehicle dispatching request is a ride request sent by user equipment, the ride request comprises first indicating information, and the first indicating information is used to indicate a user type of a user to be taken; and the computer instructions are configured to enable the computer to:
   acquire multiple preset task types, and a serviceable user type corresponding to each preset task type;
   determine the first task type from the multiple preset task types according to the user type of the user to be taken, wherein the serviceable user type corresponding to the first task type comprises the user type of the user to be taken; and
   in a case that the unmanned vehicle dispatching request is an order receiving request sent by the first unmanned vehicle, the order receiving request comprises an identifier of the first unmanned vehicle, and the computer instructions are specifically configured to enable the computer to:
   determine the first task type corresponding to the first unmanned vehicle to be dispatched according to the identifier of the first unmanned vehicle;
   wherein the computer instructions are configured to enable the computer to:
   determine an order type, from a plurality of order types, of the first order according to the unmanned vehicle dispatching request and the first task type; and
   generate the first order according to the order type of the first order.

* * * * *